United States Patent
Perry

(10) Patent No.: US 9,436,448 B2
(45) Date of Patent: Sep. 6, 2016

(54) OPTIMIZATION OF META-TEMPLATE INSTANTIATIONS

(71) Applicant: International Business Machines Corporation, Armonk, NY (US)

(72) Inventor: Sean Douglas Perry, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/556,271

(22) Filed: Dec. 1, 2014

(65) Prior Publication Data

US 2015/0186122 A1    Jul. 2, 2015

Related U.S. Application Data

(63) Continuation of application No. 12/894,642, filed on Sep. 30, 2010, now Pat. No. 8,904,370.

(30) Foreign Application Priority Data

Sep. 30, 2009    (CA) ...................................... 2678767

(51) Int. Cl.
G06F 9/45    (2006.01)
(52) U.S. Cl.
CPC ................. *G06F 8/443* (2013.01); *G06F 8/41* (2013.01)
(58) Field of Classification Search
USPC ........................................................ 717/152
See application file for complete search history.

(56) References Cited

U.S. PATENT DOCUMENTS

| | | | |
|---|---|---|---|
| 5,835,771 A | 11/1998 | Veldhuizen | |
| 5,845,103 A | 12/1998 | Sodani et al. | |
| 5,864,700 A | 1/1999 | Barton et al. | |
| 5,900,870 A * | 5/1999 | Malone | G06F 17/3056 715/866 |
| 6,968,541 B1 | 11/2005 | Hanson et al. | |
| 7,225,438 B2 | 5/2007 | Hostetter et al. | |
| 8,091,071 B2 | 1/2012 | Tsantilis | |

OTHER PUBLICATIONS

Abrahams & Gurtovoy, "C++ Template Metaprogranning", Dec. 2004, Addison-Wesley, Boston, US, 392 pages.
"Template Instantiation—Using GNU Compiler Collection", http://gcc.gnu.org/onlinedocs/gss/Template-Instantiation.html, Printed Jun. 18, 2009, 2 pages.
"Template Metaprogramming", http://en.wikipedia.org/wiki/Template_metaprogramming, Wikipedia, Printed Jun. 18, 2009, 6 pages.

* cited by examiner

*Primary Examiner* — Hang Pan
(74) *Attorney, Agent, or Firm* — Jordan IP Law, LLC

(57) ABSTRACT

An illustrative embodiment provides a computer-implemented method for an alternate type system for optimizing the evaluation and use of meta-template instantiations. The computer-implemented method obtains a source code, instantiates an element of the source code to form an instantiated element and identifies a meta-template within the instantiated element to form an identified meta-template. The computer-implemented method creates an entry for the identified meta-template in a first data structure, wherein the entry comprises a set of mapped entries, creates an associated entry in a second data structure linked to the entry comprising the set of mapped entries, wherein the associated entry represents the set of mapped entries, and uses the associated entry of the second data structure in combination with the entry of the first data structure.

15 Claims, 8 Drawing Sheets

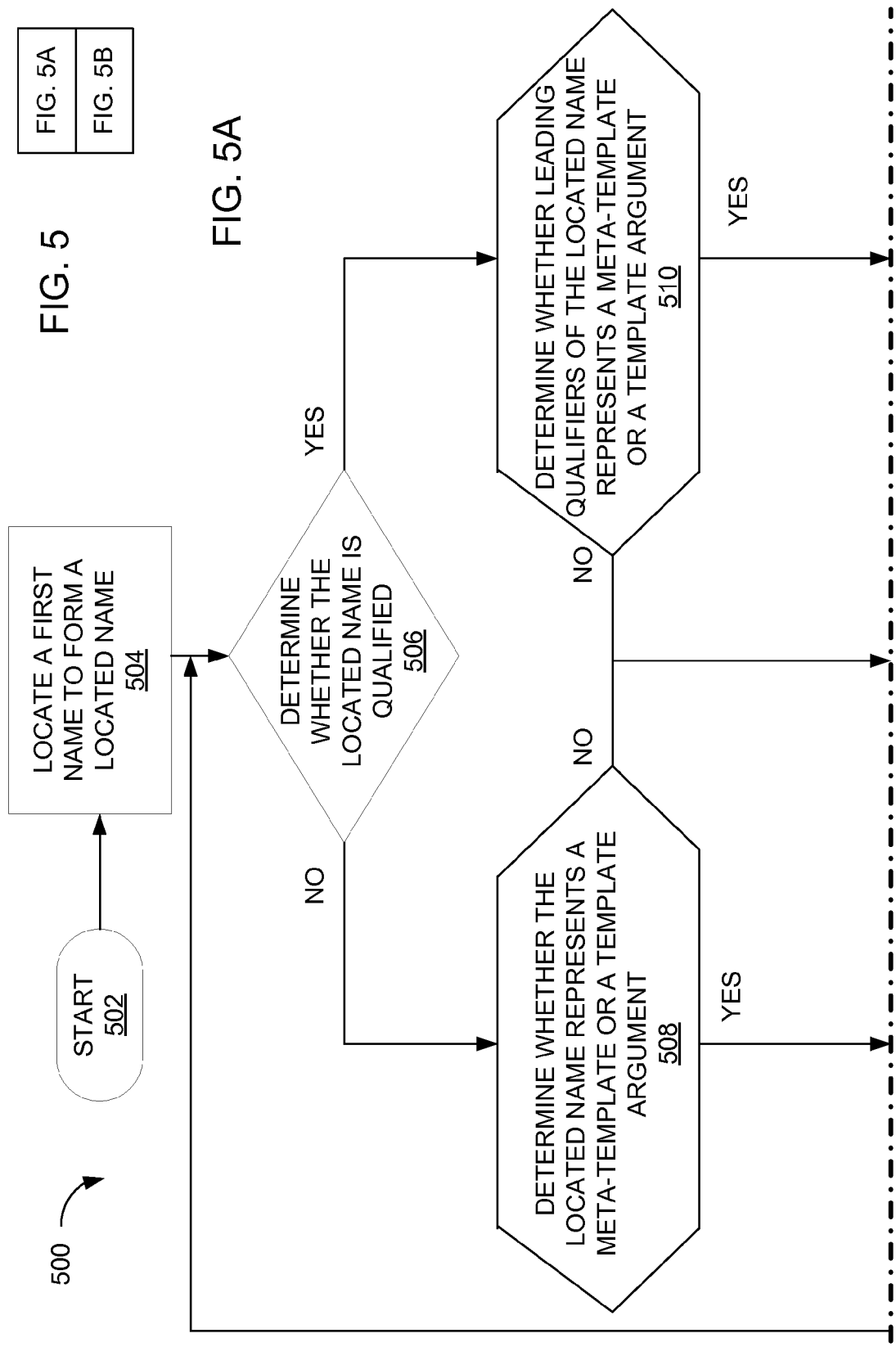

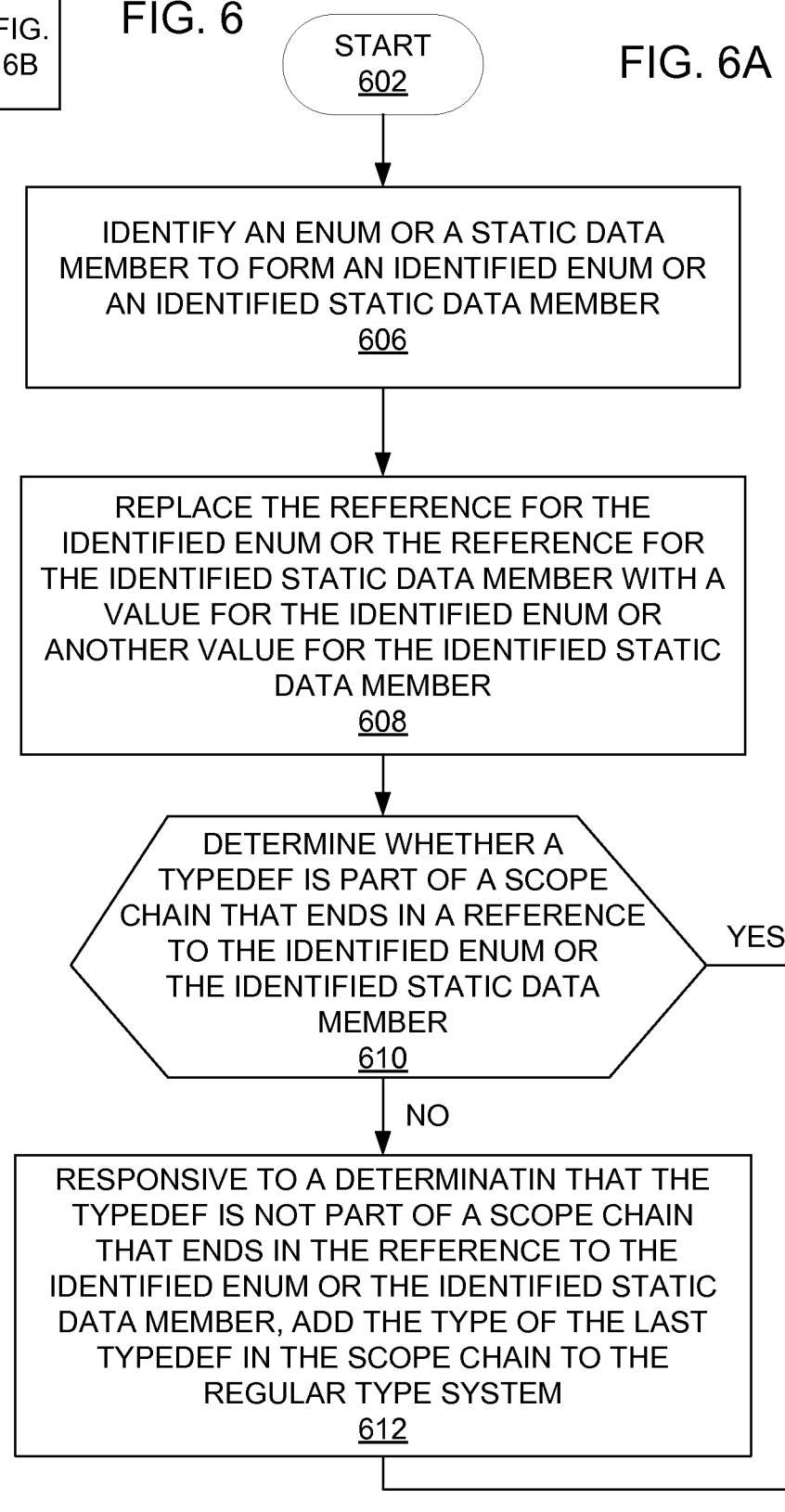

OPTIMIZATION OF META-TEMPLATE INSTANTIATIONS

CROSS-REFERENCE TO RELATED APPLICATIONS

The present application is a continuation of U.S. patent application Ser. No. 12/894,642 filed on Sep. 30, 2010, now U.S. Pat. No. 8,904,370.

FIELD OF THE INVENTION

This disclosure relates generally to programming language optimization in a data processing system and more specifically to an alternate type system for optimizing the evaluation of meta-template instantiations in programming compilations.

BACKGROUND

Within the C++ programming language, programmers have created a functional programming language using various implementations of the template and the type system. Current compiler implementations allow programmers to program complex problems using template instantiations, which enable aspects of the problems to be solved at compile time rather than at run time. However, the type system of the compiler is not designed to handle the large number of template instantiations and types created while computing the results. As use of the type system increases the performance of the compiler degrades.

For example, in the following code snippet, the template class Fib<20> will create Fib<19> and Fib<18>. This progressive instantiation continues until the specializations Fib<1> and Fib<0> are used. The specializations provide termination of the recursive process.

```
template <int N>
struct Fib {
enum E {Result = Fib<N-1>::Result+Fib<N-2>::Result};
};
template <> struct Fib<O> {enum {Result = 0};1;
template <> struct Fib<1> {enum {Result = 0};};
int x = Fib<20>::Result;
```

Although the user only used Fib<20>, other instantiations were required to compute the result. In this case the number of extra instantiations grows linearly with the value of the template argument. Use of Fib<21> will only require one more instantiation than Fib<20>.

As program complexity increases, so does the recursion thereby causing an overload of the regular type system. As the regular type system of the compiler becomes overloaded the compilation time increases due to the number of and size of entries to be processed as well as the time required for performing the compilations.

SUMMARY

According to one embodiment, a computer-implemented method for an alternate type system for optimizing the evaluation and use of meta-template instantiations obtains a source code, instantiates an element of the source code to form an instantiated element, identifies a meta-template within the instantiated element to form an identified meta-template, creates an entry for the identified meta-template in a first data structure, wherein the entry comprises a set of mapped entries, creates an associated entry in a second data structure linked to the entry comprising the set of mapped entries, wherein the associated entry represents the set of mapped entries, and uses the associated entry of the second data structure in combination with the entry of the first data structure.

According to another embodiment, a computer program product for an alternate type system for optimizing the evaluation and use of meta-template instantiations is presented. The computer program product comprises a computer recordable medium containing computer executable program code stored thereon, the computer executable program code comprising, computer executable program code for obtaining a source code, computer executable program code for instantiating an element of the source code to form an instantiated element, computer executable program code for identifying a meta-template within the instantiated element to form an identified meta-template, computer executable program code for creating an entry for the identified meta-template in a first data structure, wherein the entry comprises a set of mapped entries, computer executable program code for creating an associated entry in a second data structure linked to the entry comprising the set of mapped entries, wherein the associated entry represents the set of mapped entries, and computer executable program code for using the associated entry of the second data structure in combination with the entry of the first data structure.

According to another embodiment, an apparatus for an alternate type system for optimizing the evaluation and use of meta-template instantiations is presented. The apparatus comprises a communications fabric, a memory connected to the communications fabric, wherein the memory contains computer executable program code, a communications unit connected to the communications fabric, an input/output unit connected to the communications fabric, a display connected to the communications fabric, and a processor unit connected to the communications fabric, wherein the processor unit executes the computer executable program code to direct the apparatus to obtain a source code, instantiate an element of the source code to form an instantiated element, identify a meta-template within the instantiated element to form an identified meta-template, create an entry for the identified meta-template in a first data structure, wherein the entry comprises a set of mapped entries, create an associated entry in a second data structure linked to the entry comprising the set of mapped entries, wherein the associated entry represents the set of mapped entries, and use the associated entry of the second data structure in combination with the entry of the first data structure.

BRIEF DESCRIPTION OF THE SEVERAL VIEWS OF THE DRAWINGS

For a more complete understanding of this disclosure, reference is now made to the following brief description, taken in conjunction with the accompanying drawings and detailed description, wherein like reference numerals represent like parts.

DETAILED DESCRIPTION

Figure 1:
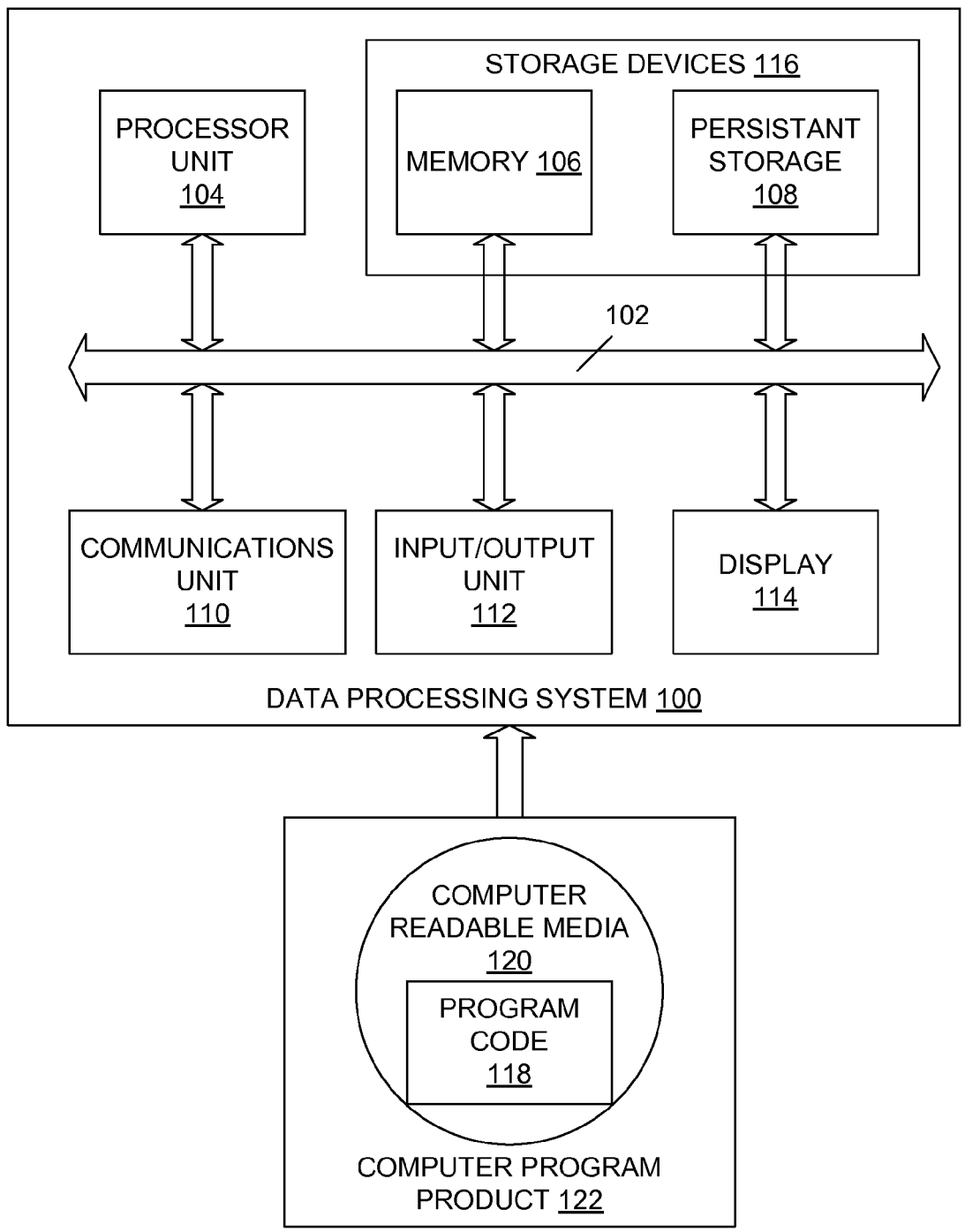
FIG. 1 is a block diagram of a data processing system environment that may be operable for various embodiments of the disclosure.

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

As will be appreciated by one skilled in the art, the present disclosure may be embodied as a system, method or computer program product. Accordingly, the present disclosure may take the form of an entirely hardware embodiment, an entirely software embodiment (including firmware, resident software, micro-code, etc.) fixed in a tangible storage medium, or an embodiment combining software and hardware aspects that may all generally be referred to herein as a "circuit," "module," or "system." Furthermore, the present invention may take the form of a computer program product tangibly embodied in any storage medium with computer usable program code embodied in the medium.

Computer program code for carrying out operations of the present disclosure may be written in any combination of one or more programming languages, including an object oriented programming language such as Java™, Smalltalk, C++, or the like and conventional procedural programming languages, such as the "C" programming language or similar programming languages. Java and all Java-based trademarks and logos are trademarks of Sun Microsystems, Inc., in the United States, other countries or both. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus, systems, and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer or other programmable data processing apparatus to function in a particular manner, such that the instructions stored in the computer readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide processes for implementing the functions/acts specified in the flowchart and/or block diagram block or blocks.

Turning now to FIG. 1, a block diagram of an exemplary data processing system environment that may be operable for various embodiments of the disclosure is presented. In this illustrative example, data processing system 100 includes communications fabric 102, which provides communications between processor unit 104, memory 106, persistent storage 108, communications unit 110, input/output (I/O) unit 112, and display 114.

Processor unit 104 serves to execute instructions for software that may be loaded into memory 106. Processor unit 104 may be a set of one or more processors or may be a multi-processor core, depending on the particular implementation. Further, processor unit 104 may be implemented using one or more heterogeneous processor systems in which a main processor is present with secondary processors on a single chip. As another illustrative example, processor unit 104 may be a symmetric multi-processor system containing multiple processors of the same type.

Memory 106 and persistent storage 108 are examples of storage devices 116. A storage device is any piece of hardware that is capable of storing information, such as, for example without limitation, data, program code in functional form, and/or other suitable information either on a temporary basis and/or a permanent basis. Memory 106, in these examples, may be, for example, a random access memory or any other suitable volatile or non-volatile storage device. Persistent storage 108 may take various forms depending on the particular implementation. For example, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, a removable hard drive may be used for persistent storage 108.

Communications unit 110, in these examples, provides for communications with other data processing systems or devices. In these examples, communications unit 110 is a network interface card. Communications unit 110 may provide communications through the use of either or both physical and wireless communications links Input/output unit 112 allows for input and output of data with other devices that may be connected to data processing system 100. For example, input/output unit 112 may provide a connection for user input through a keyboard, a mouse, and/or some other suitable input device. Further, input/ output unit 112 may send output to a printer. Display 114 provides a mechanism to display information to a user.

Instructions for the operating system, applications and/or programs may be located in storage devices 116, which are in communication with processor unit 104 through communications fabric 102. In these illustrative examples the instructions are in a functional form on persistent storage 108. These instructions may be loaded into memory 106 for execution by processor unit 104. The processes of the different embodiments may be performed by processor unit 104 using computer-implemented instructions, which may be located in a memory, such as memory 106.

These instructions are referred to as program code, computer usable program code, or computer readable program code that may be read and executed by a processor in processor unit 104. The program code in the different embodiments may be embodied on different physical or tangible computer readable media, such as memory 106 or persistent storage 108.

Program code 118 is located in a functional form on computer readable media 120 that is selectively removable and may be loaded onto or transferred to data processing system 100 for execution by processor unit 104. Program code 118 and computer readable media 120 form computer program product 122 in these examples. In one example, computer readable media 120 may be in a tangible form, such as, for example, an optical or magnetic disc that is inserted or placed into a drive or other device that is part of persistent storage 108 for transfer onto a storage device, such as a hard drive that is part of persistent storage 108. In a tangible form, computer readable media 120 also may take the form of a persistent storage, such as a hard drive, a thumb drive, or a flash memory that is connected to data processing system 100. The tangible form of computer readable media 120 is also referred to as computer recordable storage media. In some instances, computer readable media 120 may not be removable.

In some illustrative embodiments, program code 118 may be downloaded over a network to persistent storage 108 from another device or data processing system for use within data processing system 100. For instance, program code stored in a computer readable storage medium in a server data processing system may be downloaded over a network from the server to data processing system 100. The data processing system providing program code 118 may be a server computer, a client computer, or some other device capable of storing and transmitting program code 118.

The different components illustrated for data processing system 100 are not meant to provide architectural limitations to the manner in which different embodiments may be implemented. The different illustrative embodiments may be implemented in a data processing system including components in addition to or in place of those illustrated for data processing system 100. Other components shown in FIG. 1 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 100 may be any hardware apparatus that may store data. Memory 106, persistent storage 108 and computer readable media 120 are examples of storage devices in a tangible form.

In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106 or a cache such as found in an interface and memory controller hub that may be present in communications fabric 102.

Illustrative embodiments thus provide examples of identifying meta-templates within instantiated source code elements. Dependent functions instantiated from the meta-template are mapped into an alternate type system. Each entry in the alternate type system is smaller than a similar entry in a regular type system. The use of the alternate type system typically allows the compiler to perform more efficiently than when using the regular type system without the alternate type system.

Using data processing system 100 of FIG. 1 as an example, an illustrative embodiment provides a computer-implemented method for an alternate type system for optimizing the evaluation and use of meta-template instantiations. The computer-implemented method using processor unit 104 to obtain a source code from storage devices 116 through communications fabric 102, instantiates an element of the source code to form an instantiated element and identifies a meta-template within the instantiated element to form an identified meta-template. The computer-implemented method creates an entry for the identified meta-template in a first data structure, which may reside in memory 106 or persistent storage 108, wherein the entry comprises a set of mapped entries, creates an associated entry in a second data structure, which also may reside in memory 106 or persistent storage 108, linked to the set of mapped entries, wherein the associated entry represents the set of mapped entries; and uses the associated entry of the second data structure in combination with the entry of the first data structure. The computer-implemented method thus provides an alternate type system of the first data structure to optimize use of meta-template instantiations in programming compilations. The computer-implemented method may be stored in storage devices 116 until used or installed as program code 118 from computer readable media 120 in the form of program product 122.

Figure 2:
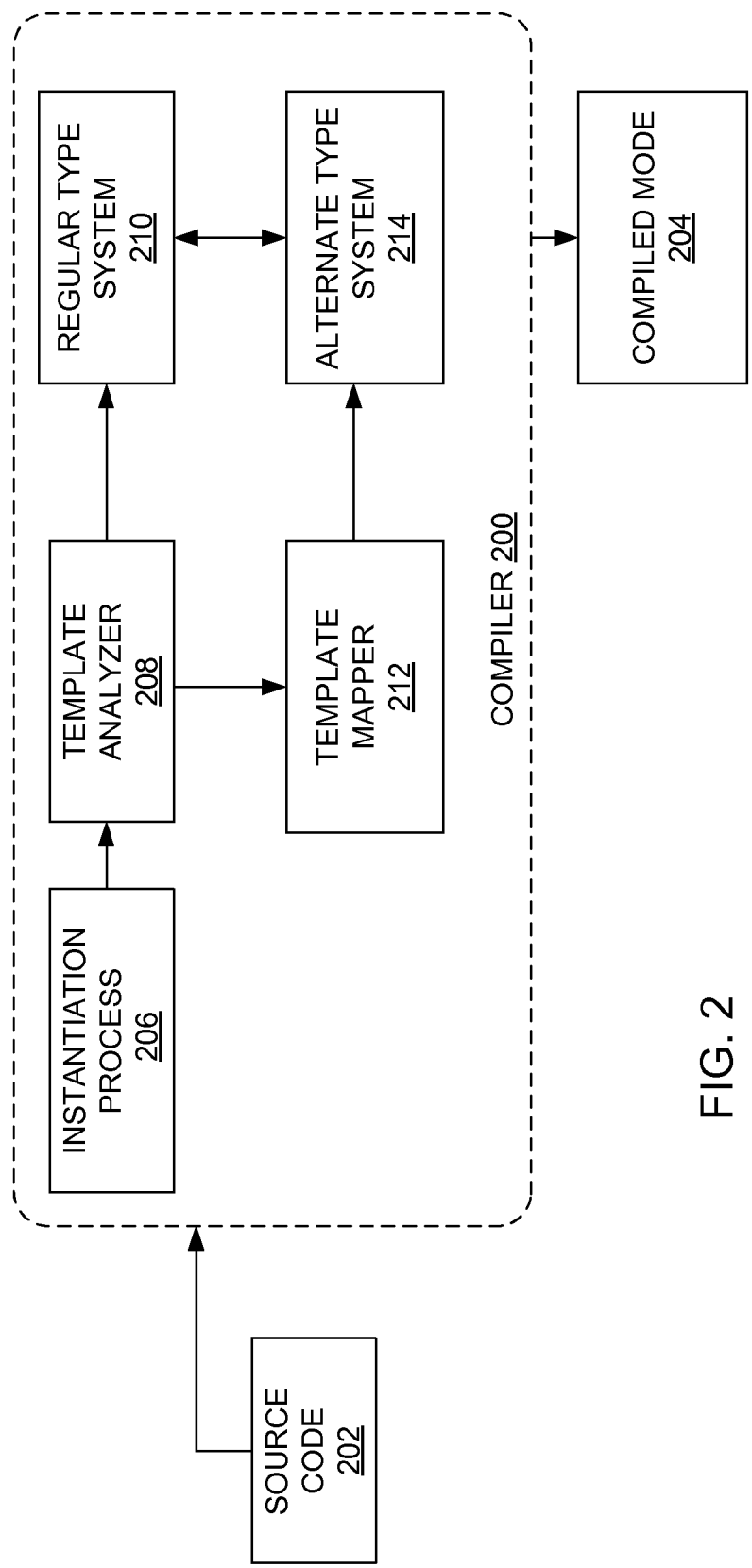
FIG. 2 is a block diagram of high level components of a compiler, in accordance with various embodiments of the disclosure.

With reference to FIG. 2, a block diagram of high-level components of a compiler, in accordance with various embodiments of the disclosure is presented. Compiler 200 comprises a number of components for the compilation of source code 202 into compiled code 204. Components of compiler 200 include, but are not limited to, instantiation process 206, template analyzer 208, regular type system 210, template mapper 212 and alternate type system 214.

Source code 202 may contain various templates embedded within a set of instructions. Source code 202 is provided as input for parsing to compiler 200. In conjunction with parsing, instantiation process 206 determines whether a template is located within the source code being processed. When a determination is made that a template of some form is present, template analyzer 208 determines whether the template is of a form known as a meta-template.

When the template, as determined by template analyzer 208, is not a meta-template, the template is processed to generate the required entries associated with the template into regular type system 210. When the template as determined by template analyzer 208 is a meta-template, template mapper 212 further processes the meta-template to evaluate the meta-template by creating a set of entries in a first data structure comprising an alternate type system 214. The set of entries for the meta-template, comprising one or more entries, stored in alternate type system 214, are smaller in size than associated entries created for a second data structure of a regular type system 210. The smaller size of each entry, contained within, allow alternate type system 214 to typically be more efficient and responsive than regular type system 210. Alternate type system 214 therefore provides a compact type system and includes a link from the set of entries for the meta-template to regular type system 210. The reduced size of each entry in alternate type system 214 enables efficient processing in conjunction with regular type system 210 and thus provides an optimization of the evaluation and use of the meta-template when compared to an implementation with only the use of regular type system 210.

For example, a set of entries for a meta-template may have five entries in alternate type system 214. The five entries are dependent entries used within the context of the identified meta-template. There is one link from the set of five entries of the meta-template to an associated entry in regular type system 210. Regular type system 210, in illustrative embodiments, does not include the dependent entries, as maintained in a compact form, of the alternate type system 214. The regular type system, in illustrative embodiments, therefore does not expand as rapidly as in previous implementations.

Figure 3:
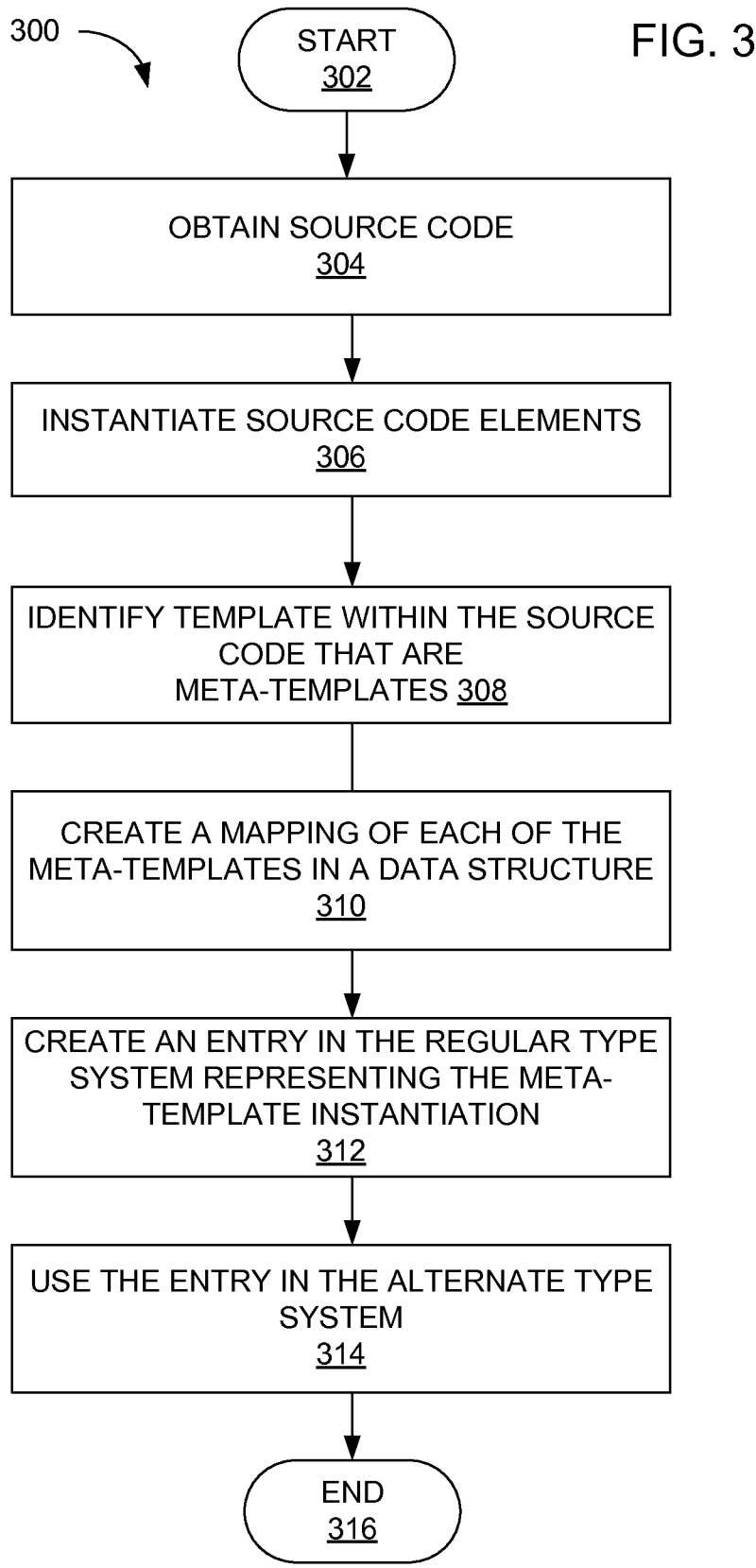
FIG. 3 is a flowchart of a high level process using the compiler of FIG. 2 in accordance with one embodiment of the disclosure.

With reference to FIG. 3 a flowchart of a high-level process using the compiler of FIG. 2 in accordance with one embodiment of the disclosure is presented. Process 300 is an example of using compiler 200 of FIG. 2 in a C++ programming environment. A meta-template can be recognized within source code 202 by compiler 200 of FIG. 2. A meta-template is a template that has no data members and therefore contains only enums or static data members and only static member functions. A meta-template typically has one or more of constant static data members, enums, typedefs and static member functions, for example, class scope constants.

A user typically instantiates one meta-template to get an answer while the compiler needs to instantiate a large number of other meta-templates to compute the answer. All of the instantiations take place in regular type system 210 that compiler 200 of FIG. 2 uses for user declared types. The many instantiations in regular type system 210 bloat the type system and slow down compilation. Another effect of the previous implementations is to constrain the size of problems that can be solved using meta-templates. The ability to resolve problems is therefore limited by the size of and time that is required to use regular type system 210 of FIG. 2.

In the illustrative embodiment of FIG. 3 process 300 starts (step 302) and obtains a source code, such as source code 202 of FIG. 2 (step 304). Instantiation of source code elements is performed (step 306). As each source code element is instantiated an identification of templates within the source code is performed (step 308). The identification operation of process 300 determines whether there are templates and whether the identified templates are meta-templates. Each instantiation of the identified meta-templates is placed in a separate entry of alternate type system 214 of compiler 200 of FIG. 2. The alternate type system will be smaller and faster than the regular type system. The compiler can use the alternate type system for a template if a set of predefined conditions is met: A first condition requires the template to be a meta-template. A second condition requires the template to have one or more explicit (or partial) specializations. The specializations act as terminating conditions that will stop the recursive template instantiations associated with the processing of the meta-template.

Having identified a template as a meta-template in step 308, process 300 creates for each of these templates a mapping to map the C++ data structure into a small data structure, within the compiler (step 310). When the meta-template is evaluated other instantiations may be required. The recursive behaviour of meta-templates, for example where a function Fib<20> instantiates function Fib<19> and function Fib<18>, and other functions in sequence, will create a graph in the alternate type system that is used to evaluate the result of the instantiation done by the program. Each node in the graph represents one instantiation. Each node contains the values assigned to static data members, and enums and typedefs to non-meta-template types. The edges between the nodes represent the typedefs to other meta-templates.

When the compiler encounters an instantiation for a template within the user code that satisfies the criteria for a meta-template, compiler 200 of FIG. 2 will first create a mapping for the instantiation in the meta-template instantiation graph, alternate type system 214 of FIG. 2. That mapping will then be used to create an associated entry in regular type system 210 of FIG. 2 representing the instantiation associated with the meta-template (step 312). The associated entry contains the results of the evaluation. Regular type system 210 of FIG. 2 then only increases by one entry instead of the large number of entries required to compute the results for the instantiation associated with the meta-template. The set of entries, in the alternate type system, from the source code is processed to resolve the problem (step 314) with process 300 terminating thereafter (step 316).

Static member functions for meta-templates are also handled specially to minimize the number of instantiations that are generated. Typically a static member function will use some of the instantiations only found in the alternate type system. The source code of a static member function needs to be transformed so the instantiations that were only created in alternate type system 214 of FIG. 2 are replaced with the results. This is done by generating the code for the static member functions of the meta-template instantiations that are actually used by the different mechanisms of process 300 rather than a process for regular functions.

Figure 4:
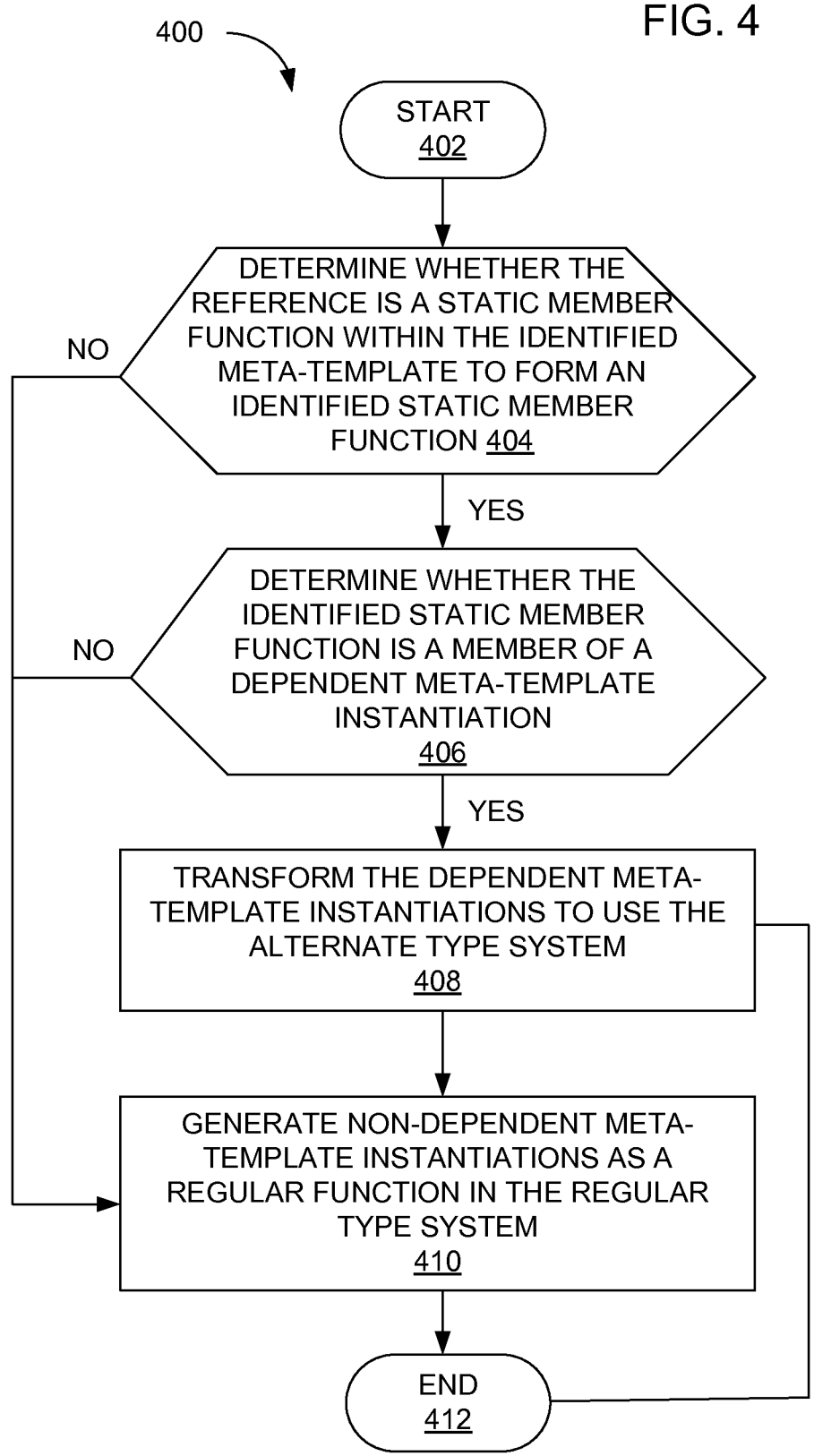
FIGS. 4 is a flowchart of a process for identifying a meta-template instantiation of FIG. 3 in accordance with one embodiment of the disclosure.

With reference to FIG. 4 a flowchart of a process for identifying a meta-template instantiation of FIG. 3 in accordance with one embodiment of the disclosure is presented. Process 400 is an example of the identification process used in step 308 of process 300 of FIG. 3.

Process 400 begins (step 402) and determines whether the reference is a static member function within the identified meta-template to form an identified static member function (step 404). When a determination is made that the reference is a static member function within the identified meta-template, a "yes" result is obtained. When a determination is made that the reference is not a static member function within the identified meta-template, a "no" result is obtained. When a "no" result is obtained in step 404, process 400 skips to step 410. When a "yes" is obtained in step 404, process 400 determines whether the identified static member function is a member of a dependent meta-template instantiation (step 406). Identifiers used within the static member function can be categorized as either references to members of dependent meta-template instantiations or references to members of non-dependent meta-template instantiations.

When a determination is made that the identified static member function is a member of a dependent meta-template instantiation, a "yes" result is obtained. When a determination is made that the identified static member function is not a member of a dependent meta-template instantiation, a "no" result is obtained. When a "yes" result is obtained in step 406, the dependent meta-template instantiations are transformed to use an alternate type system (step 408) with process 400 terminating thereafter (step 412). The transformation ensures the identifiers used in the static member function that use instantiations only instantiated in the alternate type system do not create an instantiation in the regular type system.

When a "no" result is obtained in step 406, the identified static member function is a member of a non-dependent meta-template instantiation; and process 400 generates the non-dependent meta-template instantiations as a regular function in the regular type system (step 410), with process 400 terminating thereafter (step 412).

Figure 5B:
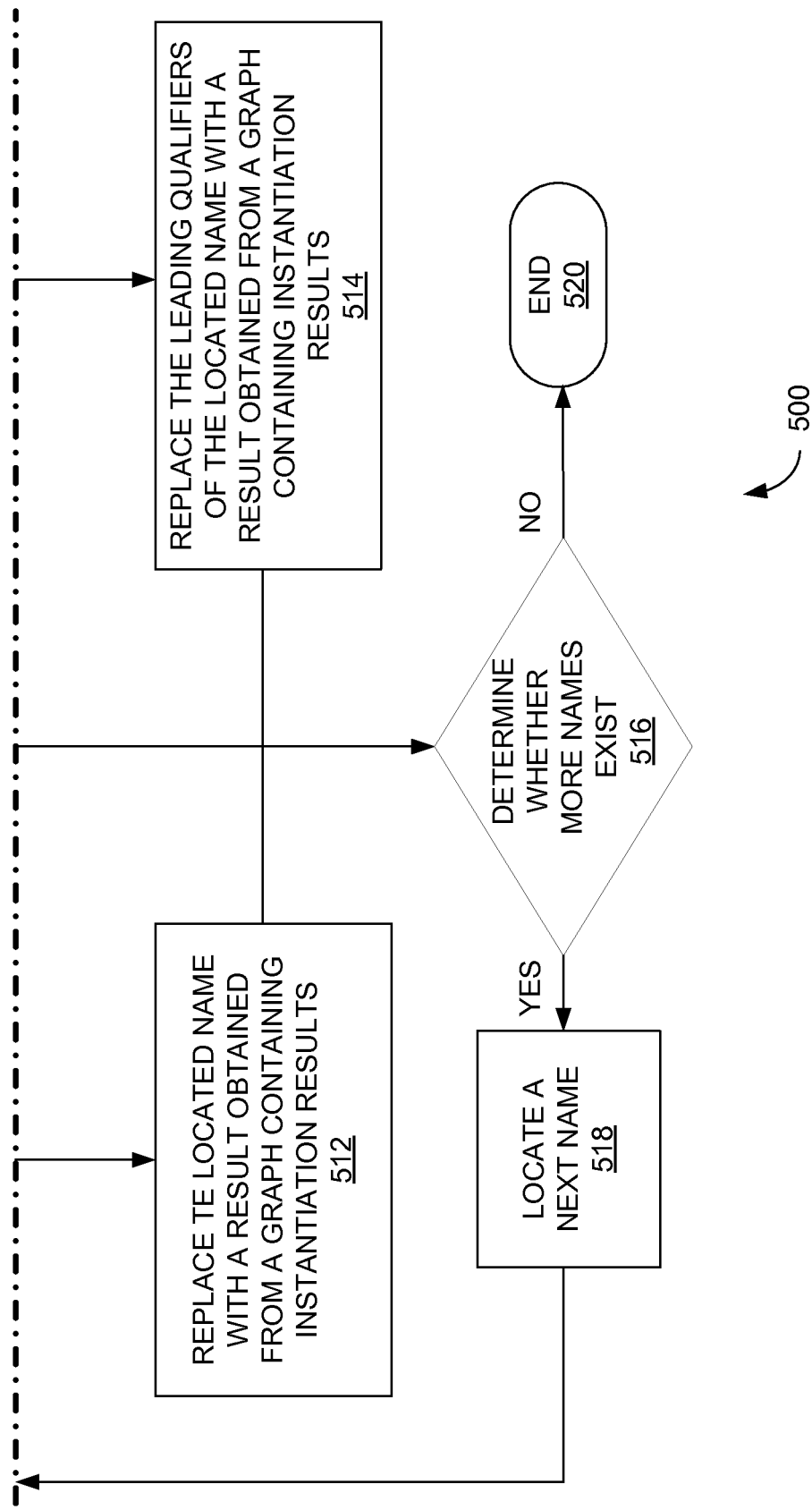
FIG. 5 (FIG. 5A and FIG. 5B) is a flowchart of a portion of a transformation process of FIG. 4 according to one embodiment of the disclosure.

With reference to FIG. 5, a flowchart of a portion of a transformation process of FIG. 4 according to one embodiment of the disclosure is presented. Process 500 is an example of replacing a reference of the transformation process of step 408 of process 400 of FIG. 4. The user code in the static member functions, provided as input to process 500, may contain references to meta-templates (including members and template arguments). The replacement performed in process 500 is designed to eliminate references in the function body that are not defined in the regular type system. Thus process 500 provides a capability to process static member functions and replace references to elements in the alternate type system with values or types from the regular type system.

Process 500 starts (step 502) and locates a first name used in the body of the static member function to form a located name (step 504). Process 500 determines whether the located name is qualified (step 506). When a determination is made that the name is qualified, a "yes" result is obtained. When a determination is made that the located name is not qualified, a "no" response is obtained.

When a "no" is obtained in step 506, a determination is made whether the located name represents a meta-template instantiation, a member of the meta-template or an argument to the meta-template (step 508). When a determination is made that the located name represents a meta-template instantiation, a member of the meta-template or a template argument, a "yes" result is obtained in step 508. When a "yes" result is obtained in step 508, process 500 replaces the located name with a result stored in the alternate type system (step 512), and process 500 proceeds to step 516. When a determination is made that the located name does not represent a meta-template instantiation, a member of the meta-template or an argument to the meta-template, a "no" result is obtained in step 508. When a "no" result is obtained in step 508, no replacement is done and process 500 skips to step 516.

When a "yes" is obtained in step 506, a determination is made whether leading qualifiers of the located name represent a meta-template instantiation, a member of the meta-template or an argument to the meta-template (step 510). When a determination is made that the leading qualifiers of the located name represent a meta-template instantiation, a member of the meta-template or an argument to the meta-template, a "yes" result is obtained in step 510. When a determination is made that leading qualifiers of the located name do not represent a meta-template instantiation, a member of the meta-template or an argument to the meta-template a "no" result is obtained in step 510. When a "no" result is obtained in step 510, no replacement is done and process 500 skips to step 516.

When a "yes" result is obtained in step 510, process 500 replaces the leading qualifiers of the located name with a corresponding result stored in the alternate type system (step 514). The replacement of the leading qualifiers transforms the qualified name to only use the identifiers and types available in the regular type system.

Process 500 then determines whether more names exist (step 516). When a determination is made that more names exist, "yes" result is obtained. When a determination is made that no more names exist, "no" result is obtained. When a "no" result is obtained, and process 500 terminates (step 520). When a "yes" result is obtained, process 500 locates a next name (step 518), with process 500 looping back to step 506.

Figure 6B:
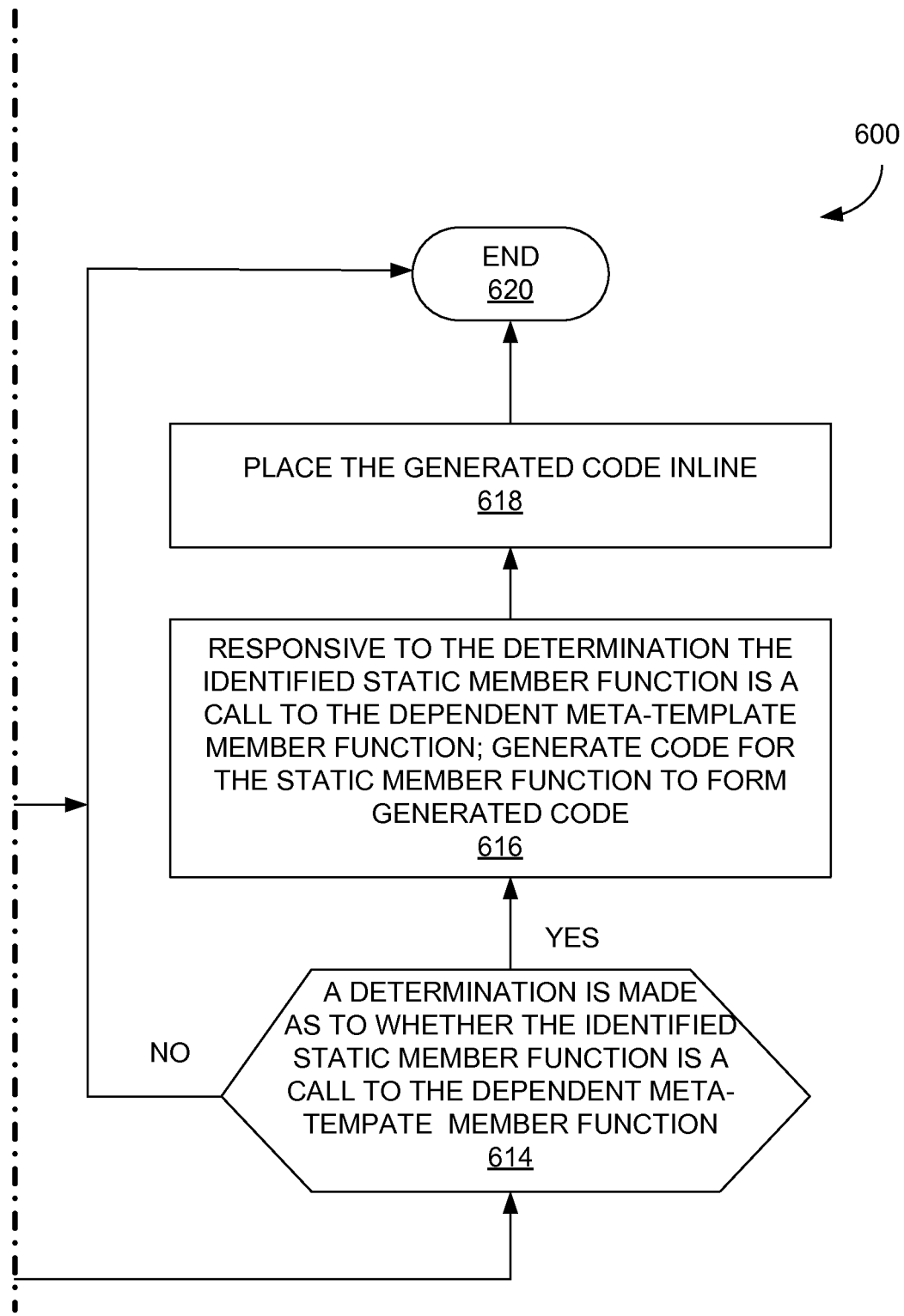
FIG. 6 (FIG. 6A and FIG. 6B) is a flowchart of a process of handling static member functions according to one embodiment of the disclosure.

With reference to FIG. 6 a flowchart of a process of handling static member functions according to one embodiment of the disclosure is presented. Process 600 is an example of a portion of transformation step 408 of process 400 of FIG. 4.

Process 600 starts (step 602) and identifies an enum or a static data member to form an identified enum or an identified static data member (step 604). Process 600 replaces the reference for the identified enum or the reference for the identified static data member with a value for the identified enum or another value for the identified static data member (step 606). A determination is made as to whether a typedef is not part of a scope chain that ends in a reference to the identified enum or the identified static data member function (step 608).

When a determination is made that the typedef is part of a scope chain that ends in a reference to the identified enum or the identified static data member function a "yes" result is obtained. When a determination is made that the typedef is not part of a scope chain that ends in a reference to the identified enum or the identified static data member function a "no" result is obtained. Responsive to a "no" result in step 608 that represents a determination that the typedef is not part of a scope chain that ends in the reference to the identified enum or the identified static data member, process 600 adds the type of the last typedef in the scope chain to the regular type system (step 610). Responsive receiving a "yes" in step 608, process 600 terminates (step 620).

Following step 612, a determination is made whether the identified static member function is a call to a dependent meta-template member function is performed (step 614). When a determination is made that the identified static member function is a call to the dependent meta-template member function, a "yes" result is obtained. When a determination is made that the identified static member function is not a call to the dependent meta-template member function, a "no" result is obtained.

Responsive to the identified static member function being a call to a dependent meta-template member function, obtaining a "yes" result in step 612; Process 600 generates code for the static member function to form generated code (step 616). Process 600 places the generated code inline (step 618), terminating thereafter (step 620). When the reference to the static member function takes the address of the static member function then the static member function has to be generated just as though the user instantiated the template. When a "no" result is obtained in step 614, process 600 terminates thereafter (step 620).

Illustrative embodiments thus provide examples of identifying meta-templates within instantiated source code elements. Dependent functions instantiated from the meta-template are mapped into an alternate type system. Each entry in the alternate type system is smaller than a similar entry in a regular type system, however each entry represents a collection of entries that would have otherwise been made in the regular type system.

An illustrative embodiment provides a computer-implemented method for an alternate type system for optimizing evaluation and use of meta-template instantiations. The computer-implemented method obtains a source code, instantiates an element of the source code to form an instantiated element and identifies a meta-template within the instantiated element to form an identified meta-template. The computer-implemented method creates an entry for the identified meta-template in a first data structure, wherein the entry comprises a set of mapped entries; creates an associated entry in a second data structure, a regular type system, linked to the set of mapped entries, wherein the associated entry represents the set of mapped entries; and uses the associated entry of the second data structure in combination with the entry of the first data structure. The computer-implemented method thus provides an alternate type system in the form of a first data structure to optimize evaluation and use of meta-template instantiations in program compilations.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing a specified logical function. It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, and other software media that may be recognized by one skilled in the art.

It is important to note that while the present invention has been described in the context of a fully functioning data processing system, those of ordinary skill in the art will appreciate that the processes of the present invention are capable of being distributed in the form of a computer readable medium of instructions. Examples of computer readable media include recordable-type media, such as a floppy disk, a hard disk drive, a RAM, CD-ROMs, and DVDROMs. The computer readable media may take the form of coded formats that are decoded for actual use in a particular data processing system.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

What is claimed is:

1. A computer program product comprising:
a non-transitory computer readable storage medium; and
computer usable code stored on the non-transitory computer readable storage medium, where, when executed by a processor, the computer usable code causes a computer to:
determine that a template in a source code is a meta-template and a template in the source code is in a form other than the meta-template;
create a set of entries in a first data structure of an alternate type system for the meta-template, wherein each entry of the set of entries is to correspond to a separate recursive instantiation, and wherein the alternate type system is to include a graph having a node for each separate recursive instantiation; and
conduct an evaluation of the set of entries in the first data structure of the alternate type system to generate a single entry in a second data structure of a regular type system that is to be utilized to resolve a problem, wherein the single entry is to correspond to a result of the evaluation, and wherein the second data structure of the regular type system is to include an entry for the template in the form other than the meta-template.

2. The computer program product of claim 1, wherein, when executed by a processor, the computer usable code causes a computer to instantiate the source code to identify any template in the source code.

3. The computer program product of claim 1, wherein, when executed by a processor, the computer usable code causes a computer to generate an entry for the template in the form other than the meta-template in the second data structure of the regular type system independent of the evaluation.

4. The computer program product of claim 1, wherein the node for each separate recursive instantiation is to contain a value of a static data member, an enum, and a typedef.

5. The computer program product of claim 1, wherein, when executed by a processor, the computer usable code causes a computer to provide a link from the set of entries in the first data structure of the alternate type system to map the set of entries to the single entry in the second data structure of the regular type system.

6. A method comprising:
   determining that a template in a source code is a meta-template and a template in the source code is in a form other than the meta-template;
   creating a set of entries in a first data structure of an alternate type system for the meta-template, wherein each entry of the set of entries corresponds to a separate recursive instantiation, and wherein the alternate type system includes a graph having a node for each separate recursive instantiation; and
   conducting an evaluation of the set of entries in the first data structure of the alternate type system to generate a single entry in a second data structure of a regular type system that is utilized to resolve a problem, wherein the single entry corresponds to a result of the evaluation, and wherein the second data structure of the regular type system includes an entry for the template in the form other than the meta-template.

7. The method of claim 6, further including instantiating the source code to identify any template in the source code.

8. The method of claim 6, further including generating an entry for the template in the form other than the meta-template in the second data structure of the regular type system independent of the evaluation.

9. The method of claim 6,
   wherein the node for each separate recursive instantiation contains a value of a static data member, an enum, and a typedef.

10. The method of claim 6, further including providing a link from the set of entries in the first data structure of the alternate type system to map the set of entries to the single entry in the second data structure of the regular type system.

11. An apparatus comprising a processor to implement one or more of:
   a template analyzer to determine that a template in a source code is a meta-template and a template in the source code is in a form other than the meta-template; and
   a template mapper to:
      create a set of entries in a first data structure of an alternate type system for the meta-template, wherein each entry of the set of entries is to correspond to a separate recursive instantiation, and wherein the alternate type system is to include a graph having a node for each separate recursive instantiation; and
      conduct an evaluation of the set of entries in the first data structure of the alternate type system to generate a single entry in a second data structure of a regular type system that is to be utilized to resolve a problem, wherein the single entry is to correspond to a result of the evaluation, and wherein the second data structure of the regular type system is to include an entry for the template in the form other than the meta-template.

12. The apparatus of claim 11, further including the template analyzer to instantiate the source code to identify any template in the source code.

13. The apparatus of claim 11, further including a compiler to generate an entry for the template in the form other than the meta-template in the second data structure of the regular type system independent of the evaluation.

14. The apparatus of claim 11, wherein the
   node for each separate recursive instantiation is to contain a value of a static data member, an enum, and a typedef.

15. The apparatus of claim 11, further including the template mapper to provide a link from the set of entries in the first data structure of the alternate type system to map the set of entries to the single entry in the second data structure of the regular type system.

* * * * *